US006685871B2

(12) United States Patent
Moulton et al.

(10) Patent No.: US 6,685,871 B2
(45) Date of Patent: Feb. 3, 2004

(54) TOUGHENED BIAXIALLY ORIENTED FILM

(75) Inventors: Jeffrey D. Moulton, Morristown, NJ (US); Delroy G. Blissett, Orwigsburg, PA (US); Gary M. Bardzak, Mar-Lin, PA (US); Anthony B. Crochunis, Pottsville, PA (US); Ann M. Majestic, Pottsville, PA (US); Simon J. Porter, Allentown, PA (US); Thomas L. Staskowski, Emerald, PA (US)

(73) Assignee: Honeywell International Inc., Morristown, NJ (US)

( * ) Notice: Subject to any disclaimer, the term of this patent is extended or adjusted under 35 U.S.C. 154(b) by 463 days.

(21) Appl. No.: 09/855,441

(22) Filed: May 15, 2001

(65) Prior Publication Data

US 2002/0190436 A1 Dec. 19, 2002

(51) Int. Cl.$^7$ .............................. B29C 55/12; B32B 5/02
(52) U.S. Cl. .................. 264/466; 264/235.8; 264/290.2; 264/211; 428/331; 525/183
(58) Field of Search .................................. 264/466, 564, 264/235.8, 290.2, 171.28, 177.18, 209.1, 211; 428/331; 525/183, 420

(56) References Cited

U.S. PATENT DOCUMENTS

| | | | | |
|---|---|---|---|---|
| 4,321,336 A | * | 3/1982 | Meyer et al. ................ | 525/183 |
| 4,354,997 A | * | 10/1982 | Mizutani et al. ............. | 264/560 |
| 4,988,764 A | * | 1/1991 | Nishio et al. ................. | 525/66 |
| 5,216,075 A | * | 6/1993 | Papazoglou ................... | 525/66 |
| 5,234,993 A | * | 8/1993 | Huynh-Ba ..................... | 525/66 |
| 5,292,805 A | * | 3/1994 | Paschke et al. ............... | 525/66 |
| 5,705,565 A | * | 1/1998 | Hughes et al. ................ | 525/65 |
| 6,576,181 B1 | * | 6/2003 | Yeh ............................. | 264/523 |
| 2002/0090472 A1 | * | 7/2002 | Savic .......................... | 428/34.3 |
| 2003/0031765 A1 | * | 2/2003 | Luthra et al. ................ | 426/129 |
| 2003/0157350 A1 | * | 8/2003 | Ueyama et al. .......... | 428/474.4 |

FOREIGN PATENT DOCUMENTS

| | | |
|---|---|---|
| DE | 26-54-168 | 6/1978 |
| EP | 0-985-709 | 3/2000 |
| JP | 09-111118 | 4/1997 |
| JP | 10-024489 | 1/1998 |
| JP | 10-175255 | 6/1998 |
| JP | 10-329211 | 12/1998 |

* cited by examiner

*Primary Examiner*—Mark Eashoo
(74) *Attorney, Agent, or Firm*—Virginia Szigeti; Roger H. Criss

(57) ABSTRACT

Toughened biaxially oriented polyamide films prepared by dry blending i) a polyamide homopolymer, copolymer, or blends thereof; and ii) a functionalized polyolefin terpolymer comprising maleic anhydride, ethyl acrylate, and an olefin, to thereby form a dry mixture. The dry mixture is melted to form a polymer blend, which is then formed into a polymer film. The edges of the film are pinned to a casting roll, and the film is plasticized in at least one water bath. The polymer film is subsequently biaxially oriented. The result is a toughened biaxially oriented film which is resistant to pinholes, cracks, and other structural defects. Such films are particularly suited for making packaging materials for various food products.

30 Claims, No Drawings

TOUGHENED BIAXIALLY ORIENTED FILM

BACKGROUND OF THE INVENTION

1. Field of the Invention

The invention relates to biaxially oriented polyamide films. More particularly, it describes a method for producing toughened biaxially oriented polyamide films having superior strength and resistance to pinholes, cracks, and other structural defects.

2. Description of the Related Art

It is known in the art to produce biaxially oriented polyamide films. The production of such films typically involve the steps of subjecting a polyamide resin to melt extrusion, cooling and solidifying the extruded film, reheating the unoriented film and subjecting it to drawing in the machine direction (MD) and transverse direction (TD), and heat-setting the drawn film. Drawing is usually accomplished by sequential biaxial drawing in flat form, simultaneous biaxial drawing in flat form, or simultaneous biaxial drawing in tubular form.

Unfortunately, biaxially oriented polyamide films have been known to sometimes suffer from several disadvantages such as pinholes, cracks, and other structural defects. It would therefore be desirable to formulate a biaxially oriented polyamide film having superior strength and resistance to pinholes and the like. It would also be desirable to form a process for forming such films, which process does not require expensive capital improvements beyond the capabilities of existing technology.

SUMMARY OF THE INVENTION

The invention provides a method for forming a biaxially oriented film which comprises:

a) dry blending i) a polyamide homopolymer, copolymer, or blends thereof; and ii) a functionalized polyolefin terpolymer comprising maleic anhydride, ethyl acrylate, and an olefin, to thereby form a dry mixture;

b) melting the dry mixture to thereby form a polymer blend;

c) forming the polymer blend into a polymer film;

d) pinning edges of the film to a casting roll;

e) treating the film in at least one water bath to thereby plasticize the polymer film; and f) biaxially orienting the film.

The invention further provides a biaxially oriented film formed by the above process.

The invention still further provides a method for forming a biaxially oriented film which comprises:

a) dry blending i) a polyamide homopolymer, copolymer, or blends thereof; and ii) a functionalized polyolefin terpolymer comprising maleic anhydride, ethyl acrylate, and an olefin, to thereby form a dry mixture; wherein the ethyl acrylate is present in the functionalized polyolefin terpolymer in an amount of from about 20% to about 40% by weight of the terpolymers; and wherein the maleic anhydride is present in the functionalized polyolefin terpolymer in an amount of from about 0.1% to about 1% by weight of the terpolymer; and wherein the olefin is present in the functionalized polyolefin terpolymer in an amount of from about 59% to about 79.9% by weight of the terpolymer;

b) melting the dry mixture to thereby form a polymer blend;

c) forming the polymer blend into a polymer film; and d) biaxially orienting the film.

The invention also provides a method for forming an oriented film which comprises:

a) dry blending i) a polyamide homopolymer, copolymer, or blends thereof; and ii) a functionalized polyolefin terpolymer comprising maleic anhydride, ethyl acrylate, and an olefin, to thereby form a dry mixture;

b) melting the dry mixture to thereby form a polymer blend;

c) extruding the polymer blend through a circular die, blowing it into a polymer film and quenching to produce an intermediate oriented film;

d) reheating the intermediate oriented film and biaxially reorienting in both the machine and transverse directions;

e) heating the thusly produced film under conditions sufficient to set the orientation.

It has been unexpectedly found that the present invention provides a solution to the problems of the prior art. The present invention provides toughened biaxially oriented polyamide films. The films of the invention are prepared by dry blending i) a polyamide homopolymer, copolymer, or blends thereof; and ii) a functionalized polyolefin terpolymer comprising maleic anhydride, ethyl acrylate, and an olefin, to thereby form a dry mixture. The dry mixture is melted to form a polymer blend, which is then formed into a polymer film. The edges of the film are pinned to a casting roll, and the may optionally be plasticized, for example by using low molecular weight additives or a water bath. The polymer film is subsequently biaxially oriented. The result is a toughened biaxially oriented film which is resistant to pinholes, cracks, and other structural defects. Such films are particularly suited for making packaging materials for various food products.

DETAILED DESCRIPTION OF THE PREFERRED EMBODIMENT

A method is provided for forming a toughened biaxially oriented film. This method first comprises dry blending i) a polyamide homopolymer, copolymer, or blends thereof; and ii) a functionalized polyolefin terpolymer comprising maleic anhydride, ethyl acrylate, and an olefin, to thereby form a dry mixture. The mixture is then melted, formed into a film, optionally but preferably pinned to a casting roll, optionally but preferably treated in a water containing bath, and then biaxially oriented.

The polyamide homopolymer, copolymer, or blend thereof is preferably present in the form of small dry pellets or particles, such that the polyamide component may be dry blended with other components of the invention to form a dry mixture. Suitable polyamides nonexclusively include homopolymers, copolymers, or blends thereof of nylons such as nylon 6; nylon 6,12; nylon 6,6; nylon MDX-6, and the like, and blends thereof. Of these, nylon 6 is preferred. Nylon 6 is commercially available under the trade name Capron® from Honeywell International Inc. of Morristown, N.J., USA. The polyamide component is preferably present in the dry mixture from about 85 to about 99.5% by weight of the overall dry mixture, more preferably from about 89 to about 97.5% by weight of the overall dry mixture, and most preferably from about 93 to about 96% by weight of the overall dry mixture.

The functionalized polyolefin terpolymer serves as a toughening agent such that the resulting film of the invention is highly resistant to pinholes, cracking, and other structural defects. The terpolymer component is preferably present in the dry mixture from about 0.5 to about 15% by weight of the overall dry mixture, more preferably from about 1 to about 10% by weight of the overall dry mixture, and most preferably from about 2 to about 7.5 by weight % of the overall dry mixture. The terpolymer comprises maleic anhydride, ethyl acrylate, and an olefin. For example, an ethylene/ethyl acrylate/maleic anhydride terpolymer may be obtained commercially under the trade name Lotader, available from AutoFina of Philadelphia, Pa.

The maleic anhydride component is present in the functionalized polyolefin terpolymer in an amount from about 0.1 to about 1% by weight of the overall terpolymer, more preferably from about 0.1 to about 0.5% by weight of the overall terpolymer, and most preferably from about 0.2 to about 0.3% by weight of the overall terpolymer. Amounts of maleic anhydride above about 1% may have deleterious effects on orientation.

The olefin component is preferably present in the functionalized polyolefin terpolymer in an amount from about 59 to about 79.9% by weight of the overall terpolymer, more preferably from about 60 to about 78% by weight of the overall terpolymer, and most preferably from about 65 to about 75% by weight of the overall terpolymer. Suitable olefins nonexclusively include ethylene, methylene, propylene, butylene, and the like, and combinations thereof. Of these, ethylene is most preferred.

The ethyl acrylate component is preferably present in the functionalized polyolefin terpolymer in an amount from about 20 to about 40% by weight of the overall terpolymer, more preferably from about 25 to about 35% by weight of the overall terpolymer, and most preferably from about 28 to about 32% by weight of the overall terpolymer.

The components of the functionalized polyolefin terpolymer are preferably present in the form of small dry pellets or particles such as a powder, which can be dry blended together with other components of the invention in the form of a dry mixture. It is an important feature of the invention that the polyamide component and the terpolymer component are dry blended prior to melt blending the dry mixture, as described below.

The dry mixture may also optionally comprise silica. The silica may be present in the form of an antiblock masterbatch comprising silica and a polyamide. Suitable polyamides nonexclusively include those polyamides described above. If present, the silica component is present in the dry mixture in an amount of less than about 0.5% by weight of the overall mixture.

The dry mixture of the invention may optionally also include one or more conventional additives whose uses are well known to those skilled in the art. The use of such additives may be desirable in enhancing the processing of the mixture as well as improving the products or articles formed therefrom. Examples of such include: oxidative and thermal stabilizers, lubricants, mold release agents, flame-retarding agents, oxidation inhibitors, oxidation scavengers, dyes, pigments and other coloring agents, ultraviolet light stabilizers, organic or inorganic fillers including particulate and fibrous fillers, reinforcing agents, nucleators, plasticizers, as well as other conventional additives known to the art. Such may be used in amounts, for example, of up to about 10% by weight of the overall dry mixture.

Suitable ultraviolet light stabilizers include various substituted resorcinols, salicylates, benzotriazole, benzophenones, and the like. Suitable lubricants, plasticizers and mold release agents include stearic acid, stearyl alcohol, stearamides, sorbitan mono-laurate, calcium stearate and other long chain additives. The plasticizing aids are frequently added at levels of less than about 3% by weight. Suitable flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Suitable plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

Suitable fillers and extenders include fine particle size (from about $0.01\mu$ to about $10\mu$) inorganic fillers, including those of platelet or granular nature, as wells as mixtures thereof. The more preferred particle sizes are in the range of from about $0.05\mu$ to about $5\mu$. The most preferred particle size is in the range of from about $0.1\mu$ to about $1\mu$. These fillers include, mica, clay, kaolin, bentonite, and silicates, including alumina silicate. Other fine particle fillers include metal oxides, such as alumina, silica, magnesium oxide, zirconium oxide, titanium oxide. Other fine particle size include carbonates such as calcium carbonate, magnesium carbonate, and dolomite, sulfates including calcium sulfate and barium sulfate, as well as other materials not specifically denoted here.

The dry mixture is then melt blended to form a polymer blend. Melting may be performed using any conventional method known in the art such as melt extrusion in a single screw extruder with a mixing screw, a roll mixer, or the like. Typical melting temperatures range from about 230° C. to about 300° C., preferably from about 235° C. to about 280° C. and more preferably from about 240° C. to about 260° C. for nylon 6 and its copolymers. Blending is conducted for a period of time required to attain a substantially uniform blend. Such may easily be determined by those skilled in the art.

After melt blending, the polymer blend is formed into a polymer film. This can be done using any known method such as transferring the polymer blend to a heated die, and forming a polymer film using a standard casting roll. Any conventional methods may be used which are known in the art for producing films, sheets, and articles, including extrusion techniques, blown film techniques, and thermoforming techniques. For example, the polymer blend may be fed into an infeed hopper of an extruder. The melted stream from the extruder is fed into a single manifold die and extruded into a layer. It then emerges from the die as a single layer film. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Once cooled and hardened, the result film is preferably substantially transparent.

Once the polymer film is formed, the film may be pinned along its edges to a casting roll. This may be done using, for example, electrostatic pinners.

Once formed, the polymer film may also be treated in at least one water bath. The water bath serves to plasticize the film prior to orientation. The water bath comprises water and may optionally include other additives such as neutralizers, and the like. Suitable neutralizers non-exclusively include carbonates. One preferred neutralizer comprises sodium bicarbonate. Preferred temperatures for the water bath range from about 20° C. to about 80° C., more preferably from about 25° C. to about 75° C., and most preferably from about 30° C. to about 60° C. The dwell time in the water bath preferably ranges from about 10 seconds to about 600 seconds, more preferably from about 20 seconds to about 400 seconds, and most preferably from about 30 seconds to about 300 seconds. It should be noted that any number of baths may be used, and the times and temperatures of these baths may be adjusted as deemed necessary by one skilled in the art. In a most preferred embodiment, the polymer film is treated in a first water bath at a temperature of about 43° C. (110° F.) for less than about 30 seconds, followed by a second bath at a temperature of about 52° C. (125° F.) for about 2 minutes. It is important that prior to orientation, the film of the invention has a water content of greater than about 3% water by weight of the film.

According to the invention, the polymer film is biaxially oriented. This may be done using any conventional method known in the art for orienting a film. The film may be stretched uniaxially in each of the longitudinal direction coincident with the direction of movement of the film being withdrawn from the film forming apparatus, also referred to in the art as the "machine direction", and in as direction which is perpendicular to the machine direction, and referred to in the art as the "transverse direction" to thereby produce a biaxially oriented film. In one preferred embodiment, biaxial orientation is conducted by sequentially orienting the film in each of its longitudinal and transverse directions, in either order. After the orientation process, the film is heat set to control shrinkage and crystallinity. In another preferred embodiment, biaxial orientation is conducted by simultaneously orienting the film in each of its longitudinal and transverse directions by passing the film through a heated oven. Use of a large number of heating zones facilitates orientation and controls shrinkage. It is preferred that the preheating zones in the oven are relatively high (e.g., about 180° C. to about 205° C.), and likewise the temperatures in the stretching zones are relatively high (e.g., about 170° C. to about 180° C.). After orientation the film is subsequently passed through a constrained heat setting process to control shrinkage and crystallinity.

In still another preferred embodiment, the biaxially oriented film may be produced by the "double" bubble blown film process. In the "double" bubble process the polymer blend is extruded through a circular die and blown to a minimal blow up ratio and then quenched. This initial orientation process produces a film with insufficient physical properties, due to the poor orientation possible in the molten state. This initially produced film is most commonly oriented at less than two times in both the machine and transverse directions. After the initial quenching step, the film is subsequently reheated such that the collapsed bubble can be oriented approximately three times in both the machine and transverse directions. After orientation the film then passes through a series of heated zones to "set" the orientation and limit shrinkage. Films produced according to the present invention may be oriented by stretching or drawing the films at draw ratios of from about 1.1:1 to about 10:1 in each direction, and preferably at a draw ratio of from about 2:1 to about 5:1 in each direction. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls or passing it through a series of preheating hot air ovens. The heated film may then move through a set of nip rolls downstream at a faster rate than the film entering the nip rolls at an upstream location to orient in a single direction or it may be simultaneously oriented by holding the film by the edges as it passes through an orienting oven. The change of rate is compensated for by stretching in the film.

The thickness of such films according to the invention preferably ranges from about 0.05 mils (1.3 $\mu$m) to about 100 mils (2540 $\mu$m), and more preferably from about 0.05 mils (1.3 $\mu$m) to about 50 mils (1270 $\mu$m). While such thicknesses are preferred as providing a readily flexible film, it is to be understood that other film thicknesses may be produced to satisfy a particular need and yet fall within the scope of the present invention; such thicknesses which are contemplated include plates, thick films, and sheets which are not readily flexible at room temperature (approx. 20° C.). During orientation, some or all of the water content of the film may evaporate. Preferably, the resulting film has a water content from about 0.5% to about 0.02% or less by weight of the overall film.

The following non-limiting examples serve to illustrate the invention. It will be appreciated that variations in proportions and alternatives in elements of the components of the invention will be apparent to those skilled in the art and are within the scope of the present invention.

EXAMPLE 1

A dry mixture of 95% (w/w) nylon 6 (Capron® from Honeywell) and 5% (w/w) ethylene/ethyl acrylate/maleic anhydride terpolymer (Lotader 4720 from AutoFina) was prepared and charged to the feed throat of a single screw extruder fitted with a mixing screw. To this dry mixture was also added 1.3% of an antiblock masterbatch containing approximately 7% silica. The dry mixture was conveyed along the length of the barrel, and melt blended at a melt temperature of approximately 266° C. (510° F.) to thereby form a polymer blend. After conveyance from the extruder to a T-die the polymer blend was cast onto a polished roll maintained at a temperature of approximately 7° C. (45° F.). Die temperatures were maintained at such temperatures as to achieve the desired cast polymer film gauge profile. The thickness of the initially cast polymer film was approximately 10 times the desired thickness of the final polymer film, after biaxial orientation. The edges of the cast polymer film were immediately placed into contact with the casting roll surface with air jets. Additional pinning was facilitated through the use of electrostatic pinners, which were operated with a power between about 18 kW and about 25 kW. After quenching the polymer film on the casting roll the film was passed through a series of hot water baths. The first water bath was maintained at a temperature of about 43° C. (110° F.), while the second bath was maintained at a temperature of about 52° C. (125° F.). The passage pathway was controlled so as to achieve a moisture content in the film of about 3.5% (w/w) before orientation. After plasticization the film was simultaneously oriented in both the machine and transverse directions, with the final orientation being 3×3. The film passed through eleven heating zones, which facilitated both orientation and controlled shrinkage properties. The preheating zones before orientation were approximately 185° C. (365° F.), the stretching zones were approximately 168° C. (335° F.), and the heat setting zones were approximately 185° C. (365° F.). After orientation, the film was corona treated and wound onto a collection bobbin.

EXAMPLE 2
COMPARATIVE

Example 1 was repeated except that electrostatic pinning was not used, the second bath was maintained at a temperature of about 60° C. (140° F.), the moisture content of the film was about 2.0%., the preheating zones before orientation were approximately 177° C. (350° F.) and the stretching zones were approximately 149° C. (300° F.). The orientation was unsuccessful as the film was not uniformly oriented across the finished film width.

EXAMPLE 3
COMPARATIVE

Example 1 was repeated, except that the dry mixture contained 97.5% nylon 6 and 2.5% of the terpolymer, and the moisture content was about 4.0% before orientation. This orientation process was unsuccessful as the film was not uniformly oriented across the finished film width.

EXAMPLE 4

Example 1 was repeated except that the dry mixture contained 97.5% nylon 6 and 2.5% of the terpolymer, the temperature of the first and second baths were about 38° C. (100° F.) and about 49° C. (120° F.), respectively, the moisture content was about 3.3%, the preheating zones before orientation were approximately 177° C. (350° F.) and the stretching zones were approximately 149° C. (300° F.). The film was successfully biaxially oriented across the entire finished film width.

EXAMPLE 5
COMPARATIVE

Example 4 was repeated, except that the mixture of Example 1 was used and electrostatic pinning was not employed. The film could not be biaxially oriented due to melt fluctuation exiting the die, resulting in an inability to maintain film in the orienting oven restraining clips.

The results of the above examples are shown in Table 1.

TABLE 1

| Example # | Additive Concentration | Moisture Content | Electrostatic Pinning | Orientation |
|---|---|---|---|---|
| 1 | 5% | 3.5% | Yes | ★ |
| 2 | 5% | 2.0% | No | ◆ |
| 3 | 2.5% | 4.0% | No | ◆ |
| 4 | 2.5% | 3.3% | Yes | ★ |
| 5 | 5% | 3.3% | No | ⊙ |

★ Complete orientation across the finished film width
◆ Orientation ~ 95% of the finished film width
⊙ Could not orient

EXAMPLE 6
COMPARATIVE
Nylon Film Without the Functionalized Polyolefin Terpolymer.

Example 1 was repeated except that no terpolymer was used in the film composition. In addition, the temperature of the casting roll was about 10° C. (50° F.), electrostatic pinning was not used and the temperature of the second water bath was about 60° C. (140° F.). The film passed through eleven heating zones, which facilitated both orientation and controlled shrinkage properties.

Pinhole resistance of the films produced according to Examples 1 and 6 was determined by subjecting both films to Gelbo flexing (ASTM F372), which comprises both compression and twisting motions. Both films were subjected to 10,000 flex cycles at 45 cycles per minute and a temperature of approximately 25° C. (75° F.) and 50% RH. After flexing, the film samples were tested for pin holes using a visualizing dye and penetrant.

| | Number of Detected Pinholes in ~ 7000 mm² |
|---|---|
| Example 1 | 9 |
| Example 6 | 51 |

As can be seen, many fewer pinholes develop with the film according to the invention.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method for forming a biaxially oriented film which comprises:
   a) dry blending i) a polyamide homopolymer, copolymer, or blends thereof; and ii) a functionalized polyolefin terpolymer comprising maleic anhydride, ethyl acrylate, and an olefin, to thereby form a dry mixture;
   b) melting the dry mixture to thereby form a polymer blend;
   c) forming the polymer blend into a polymer film;
   d) pinning edges of the film to a casting roll;
   e) treating the film in at least one water bath to thereby plasticize the polymer film; and
   f) biaxially orienting the film.

2. The method of claim 1 wherein the polymer blend further comprises silica.

3. The method of claim 2 wherein the silica is present in the polymer blend an amount of less than about 0.5% by weight of the overall blend.

4. The method of claim 1 wherein the functionalized polyolefin terpolymer is present in the polymer blend in an amount of from about 0.5% to about 15% by weight of the overall blend.

5. The method of claim 1 wherein the polyamide comprises nylon 6.

6. The method of claim 1 wherein the polyamide is present in the polymer blend in an amount of from about 85% to about 99.5% by weight of the overall blend.

7. The method of claim 1 wherein the olefin comprises ethylene.

8. The method of claim 1 wherein the ethyl acrylate is present in the functionalized polyolefin terpolymer in an amount of from about 20% to about 40% by weight of the terpolymer.

9. The method of claim 1 wherein the maleic anhydride is present in the functionalized polyolefin terpolymer in an amount of from about 0.1% to about 1% by weight of the terpolymer.

10. The method of claim 1 wherein the olefin is present in the functionalized polyolefin terpolymer in an amount of from about 59% to about 79.9% by weight of the terpolymer.

11. The method of claim 1 wherein the ethyl acrylate is present in the functionalized polyolefin terpolymer in an amount of from about 20% to about 40% by weight of the terpolymers; and wherein the maleic anhydride is present in the functionalized polyolefin terpolymer in an amount of from about 0.1% to about 1% by weight of the terpolymer; and wherein the olefin is present in the functionalized polyolefin terpolymer in an amount of from about 59% to about 79.9% by weight of the terpolymer.

12. The method of claim 1 wherein the polymer film has a water content of greater than about 3 weight % of the polymer film prior to orientation.

13. The method of claim 1 wherein the biaxial orientation is conducted by sequentially orienting the film in each of its longitudinal and transverse directions in either order.

14. The method of claim 1 wherein the biaxial orientation is conducted by simultaneously orienting the film in each of its longitudinal and transverse directions.

15. The method of claim 1 wherein said pinning step comprises electrostatically pinning the edges of the film to the casting roll.

16. A biaxially oriented film formed by the process of claim 1.

17. A biaxially oriented film formed by the process of claim 3.

18. A biaxially oriented film formed by the process of claim 7.

19. A biaxially oriented film formed by the process of claim 11.

20. A biaxially oriented film formed by the process of claim 12.

21. A biaxially oriented film formed by the process of claim 13.

22. A biaxially oriented film formed by the process of claim 14.

23. A biaxially oriented film formed by the process of claim 15.

24. A method for forming a biaxially oriented film which comprises:
  a) dry blending i) a polyamide homopolymer, copolymer, or blends thereof, and ii) a functionalized polyolefin terpolymer comprising maleic anhydride, ethyl acrylate, and an olefin, to thereby form a dry mixture; wherein the ethyl acrylate is present in the functionalized polyolefin terpolymer in an amount of from about 20% to about 40% by weight of the terpolymers; and wherein the maleic anhydride is present in the functionalized polyolefin terpolymer in an amount of from about 0.1% to about 1% by weight of the terpolymer; and wherein the olefin is present in the functionalized polyolefin terpolymer in an amount of from about 59% to about 79.9% by weight of the terpolymer;
  b) melting the dry mixture to thereby form a polymer blend;
  c) forming the polymer blend into a polymer film; and
  d) biaxially orienting the film.

25. The method of claim 24 further comprising pinning edges of the film to a casting roll prior to biaxially orienting the film.

26. The method of claim 25 wherein said pinning step comprises electrostatically pinning the edges of the film to the casting roll.

27. The method of claim 24 further comprising treating the polymer film in at least one water bath to thereby plasticize the film.

28. The method of claim 24 wherein the biaxial orientation is conducted by sequentially orienting the film in each of its longitudinal and transverse directions in either order.

29. The method of claim 24 wherein the biaxial orientation is conducted by simultaneously orienting the film in each of its longitudinal and transverse directions.

30. A method for forming an oriented film which comprises:
  a) dry blending i) a polyamide homopolymer, copolymer, or blends thereof; and ii) a functionalized polyolefin terpolymer comprising maleic anhydride, ethyl acrylate, and an olefin, to thereby form a dry mixture;
  b) melting the dry mixture to thereby form a polymer blend;
  c) extruding the polymer blend through a circular die, blowing it into a polymer film and quenching to produce an intermediate oriented film;
  d) reheating the intermediate oriented film and biaxially reorienting in both the machine and transverse directions;
  e) heating the thusly produced film under conditions sufficient to set the orientation.

* * * * *